(12) United States Patent
Noh et al.

(10) Patent No.: US 9,163,703 B2
(45) Date of Patent: Oct. 20, 2015

(54) PLANETARY GEAR TRAIN OF AUTOMATIC TRANSMISSION FOR VEHICLE

(71) Applicant: Hyundai Motor Company, Seoul (KR)

(72) Inventors: Myonghoon Noh, Seongnam-si (KR); Hyu Tae Shim, Hwaseong-si (KR); Kangsoo Seo, Yongin-si (KR); Jae Chang Kook, Hwaseong-si (KR); Chang Wook Lee, Suwon-si (KR); Jongsool Park, Hwaseong-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 0 days.

(21) Appl. No.: 14/084,279

(22) Filed: Nov. 19, 2013

(65) Prior Publication Data

US 2014/0162833 A1    Jun. 12, 2014

(30) Foreign Application Priority Data

Dec. 10, 2012    (KR) ........................ 10-2012-0143089

(51) Int. Cl.
*F16H 3/62* (2006.01)
*F16H 3/66* (2006.01)
*F16H 1/46* (2006.01)
*F16H 3/44* (2006.01)
*F16H 37/08* (2006.01)
*F16H 37/04* (2006.01)

(52) U.S. Cl.
CPC .................. *F16H 3/62* (2013.01); *F16H 3/666* (2013.01); *F16H 1/46* (2013.01); *F16H 3/44* (2013.01); *F16H 37/046* (2013.01); *F16H 37/0853* (2013.01); *F16H 2200/006* (2013.01); *F16H 2200/201* (2013.01); *F16H 2200/2043* (2013.01)

(58) Field of Classification Search
CPC ..................................... F16H 3/62; F16H 3/44
See application file for complete search history.

(56) References Cited

U.S. PATENT DOCUMENTS

| 7,294,079 | B2 * | 11/2007 | Raghavan et al. | 475/5 |
| 7,857,726 | B2 * | 12/2010 | Borgerson | 475/311 |
| 7,976,424 | B2 * | 7/2011 | Phillips et al. | 475/275 |
| 8,083,633 | B2 * | 12/2011 | Wittkopp et al. | 475/296 |
| 2012/0088627 | A1 * | 4/2012 | Phillips | 475/275 |

* cited by examiner

*Primary Examiner* — Derek D Knight
*Assistant Examiner* — David Morris
(74) *Attorney, Agent, or Firm* — Morgan, Lewis & Bockius LLP

(57) ABSTRACT

A planetary gear train of an automatic transmission may include a first shaft receiving engine torque, a second shaft disposed in parallel to the first shaft, a first planetary gear set on the first shaft including a first element operated as a fixed element, a second element directly connected to the first shaft, and a third element, a compound planetary gear set formed by combining a second planetary gear set and a third planetary gear set including a fourth element selectively connected to the first shaft and the third element, a fifth element connected to an output gear, a sixth element selectively connected to the first element, and a seventh element selectively connected to the third element through a gear.

8 Claims, 11 Drawing Sheets

FIG. 2

|      | B1 | C1 | C2 | C3 | C4 | gear ratio |
|------|----|----|----|----|----|------------|
| 1ST  | ●  | ●  |    |    | ●  | 4.063      |
| 2ND  | ●  |    | ●  |    | ●  | 2.772      |
| 3RD  |    | ●  | ●  |    | ●  | 1.782      |
| 4TH  |    |    | ●  | ●  | ●  | 1.366      |
| 5TH  |    | ●  |    | ●  | ●  | 1.086      |
| 6TH  |    | ●  | ●  | ●  |    | 0.824      |
| 7TH  | ●  | ●  |    | ●  |    | 0.680      |
| 8TH  | ●  |    | ●  | ●  |    | 0.562      |
| REV  | ●  |    |    | ●  | ●  | -2.098     |

PLANETARY GEAR TRAIN OF AUTOMATIC TRANSMISSION FOR VEHICLE

CROSS-REFERENCE TO RELATED APPLICATION

The present application claims priority of Korean Patent Application Number 10-2012-0143089 filed Dec. 10, 2012, the entire contents of which application is incorporated herein for all purposes by this reference.

BACKGROUND OF INVENTION

1. Field of Invention

The present invention relates to an automatic transmission for a vehicle. More particularly, the present invention relates to a planetary gear train of an automatic transmission for a vehicle that can improve mountability by reducing a length thereof and reduce fuel consumption by improving power delivery performance.

2. Description of Related Art

Typically, a planetary gear train is realized by combining a plurality of planetary gear sets and friction members. It is well known that when a planetary gear train realizes a greater number of shift speeds, speed ratios of the planetary gear train can be more optimally designed, and therefore a vehicle can have economical fuel mileage and better performance. For that reason, the planetary gear train that is able to realize more shift speeds is under continuous investigation.

Though achieving the same number of speeds, the planetary gear train has a different operating mechanism according to a connection between rotation elements (i.e., sun gear, planet carrier, and ring gear). In addition, the planetary gear train has different features such a durability, power delivery efficiency, and size depend on the layout thereof. Therefore, designs for a combining structure of a gear train are also under continuous investigation.

In addition, the planetary gear train realizes a plurality of shift-speeds. However, another friction member must be operated after one friction member is released so as to shift to a neighboring shift-speed from a view of shift control. In addition, a step ratio between the neighboring shift-speeds should be controlled to be suitable according to the planetary gear train.

The information disclosed in this Background section is only for enhancement of understanding of the general background of the invention and should not be taken as an acknowledgement or any form of suggestion that this information forms the prior art already known to a person skilled in the art.

BRIEF SUMMARY

Various aspects of the present invention provide for a planetary gear train of an automatic transmission for a vehicle having advantages of improving mountability by shortening a length thereof and reducing fuel consumption by improving power delivery performance as a consequence of achieving eight forward speeds and one reverse speed having excellent operating condition of frictional elements by combining three planetary gear sets separately disposed on a first shaft and a second shaft, three externally-meshing gears, and five frictional elements.

A planetary gear train of an automatic transmission for a vehicle according to various aspects of the present invention may include: a first shaft receiving torque of an engine; a second shaft disposed in parallel with the first shaft; a first planetary gear set disposed on the first shaft, and including a first rotation element selectively operated as a fixed element or an output element, a second rotation element directly connected to the first shaft so as to be operated as an input element, and a third rotation element operated as a selective output element; a compound planetary gear set formed by combining a second planetary gear set and a third planetary gear set, and including a fourth rotation element selectively connected to the first shaft and the third rotation element through externally-meshed gears, a fifth rotation element connected to an output gear so as to be always operated as an output element, a sixth rotation element selectively connected to the first rotation element through an externally-meshed gear, and a seventh rotation element selectively connected to the third rotation element through an externally-meshed gear; three transfer gears forming the externally-meshed gears; and frictional elements selectively interconnecting the rotation elements or selectively connecting the rotation element to a transmission housing.

The first planetary gear set may be a single pinion planetary gear set including a first sun gear, a first planet carrier, and a first ring gear as rotation elements thereof, the second planetary gear set may be a double pinion planetary gear set including a second sun gear, a second planet carrier, and a second ring gear as rotation elements thereof, and the third planetary gear set may be a single pinion planetary gear set including a third sun gear, a third planet carrier, and a third ring gear as rotation elements thereof.

The first rotation element may have the first sun gear, the second rotation element may have the first planet carrier, the third rotation element may have the first ring gear, the fourth rotation element may have the second sun gear, the fifth rotation element may have the third ring gear, the sixth rotation element may have the second ring gear and the third planet carrier, and the seventh rotation element may have the second planet carrier and the third sun gear.

The three transfer gears may include: a first transfer gear disposed between the first shaft and the fourth rotation element; a second transfer gear disposed between the third rotation element and the fourth rotation element; and a third transfer gear disposed between the first rotation element and the sixth rotation element.

The frictional elements may include: a first clutch disposed between the fourth rotation element and the first transfer gear; a second clutch disposed between the second transfer gear and the fourth rotation element; a third clutch disposed between the second transfer gear and the seventh rotation element; a fourth clutch disposed between the first rotation element and the third transfer gear; and a first brake disposed between the first rotation element and the transmission housing.

The first brake and the first and fourth clutches may be operated at a first forward speed, the first brake and the second and fourth clutches may be operated at a second forward speed, the first, second, and fourth clutches may be operated at a third forward speed, the second, third, and fourth clutches may be operated at a fourth forward speed, the first, third, and fourth clutches may be operated at a fifth forward speed, the first, second, and third clutches may be operated at a sixth forward speed, the first brake and the first and third clutches may be operated at a seventh forward speed, the first brake and the second and third clutches may be operated at an eighth forward speed, and the first brake and the third and fourth clutches may be operated at a reverse speed.

A planetary gear train of an automatic transmission for a vehicle according to various aspects of the present invention may include: a first shaft receiving torque of an engine; a second shaft disposed in parallel with the first shaft; a first planetary gear set disposed on the first shaft, and including a first rotation element selectively operated as a fixed element, a second rotation element directly connected to the first shaft so as to be operated as an input element, and a third rotation element; a compound planetary gear set formed by combining a second planetary gear set and a third planetary gear set, and including a fourth rotation element selectively connected to the first shaft and the third rotation element, a fifth rotation element connected to an output gear so as to be always operated as an output element, a sixth rotation element selectively connected to the first rotation element, and a seventh rotation element selectively connected to the third rotation element; a first transfer gear disposed between the first shaft and the fourth rotation element; a second transfer gear disposed between the third rotation element and the fourth rotation element; a third transfer gear disposed between the first rotation element and the sixth rotation element; a first clutch disposed between the fourth rotation element and the first transfer gear; a second clutch disposed between the second transfer gear and the fourth rotation element; a third clutch disposed between the second transfer gear and the seventh rotation element; a fourth clutch disposed between the first rotation element and the third transfer gear; and a first brake disposed between the first rotation element and the transmission housing.

The first planetary gear set may be a single pinion planetary gear set and may include a first sun gear being the first rotation element, a first planet carrier being the second rotation element, and a first ring gear being the third rotation element. The compound planetary gear set may be formed by combining the second planetary gear set being a double pinion planetary gear set and the third planetary gear set being a single pinion planetary gear set, and may include a second sun gear being the fourth rotation element, a third ring gear being the fifth rotation element, a second ring gear and a third planet carrier being the sixth rotation element, and a second planet carrier and a third sun gear being the seventh rotation element.

The first brake and the first and fourth clutches may be operated at a first forward speed, the first brake and the second and fourth clutches may be operated at a second forward speed, the first, second, and fourth clutches may be operated at a third forward speed, the second, third, and fourth clutches may be operated at a fourth forward speed, the first, third, and fourth clutches may be operated at a fifth forward speed, the first, second, and third clutches may be operated at a sixth forward speed, the first brake and the first and third clutches may be operated at a seventh forward speed, the first brake and the second and third clutches may be operated at an eighth forward speed, and the first brake and the third and fourth clutches may be operated at a reverse speed.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 2 is an operational chart of friction members at each shift-speed applied to an exemplary planetary gear train according to the present invention.

DETAILED DESCRIPTION

Figure 1:
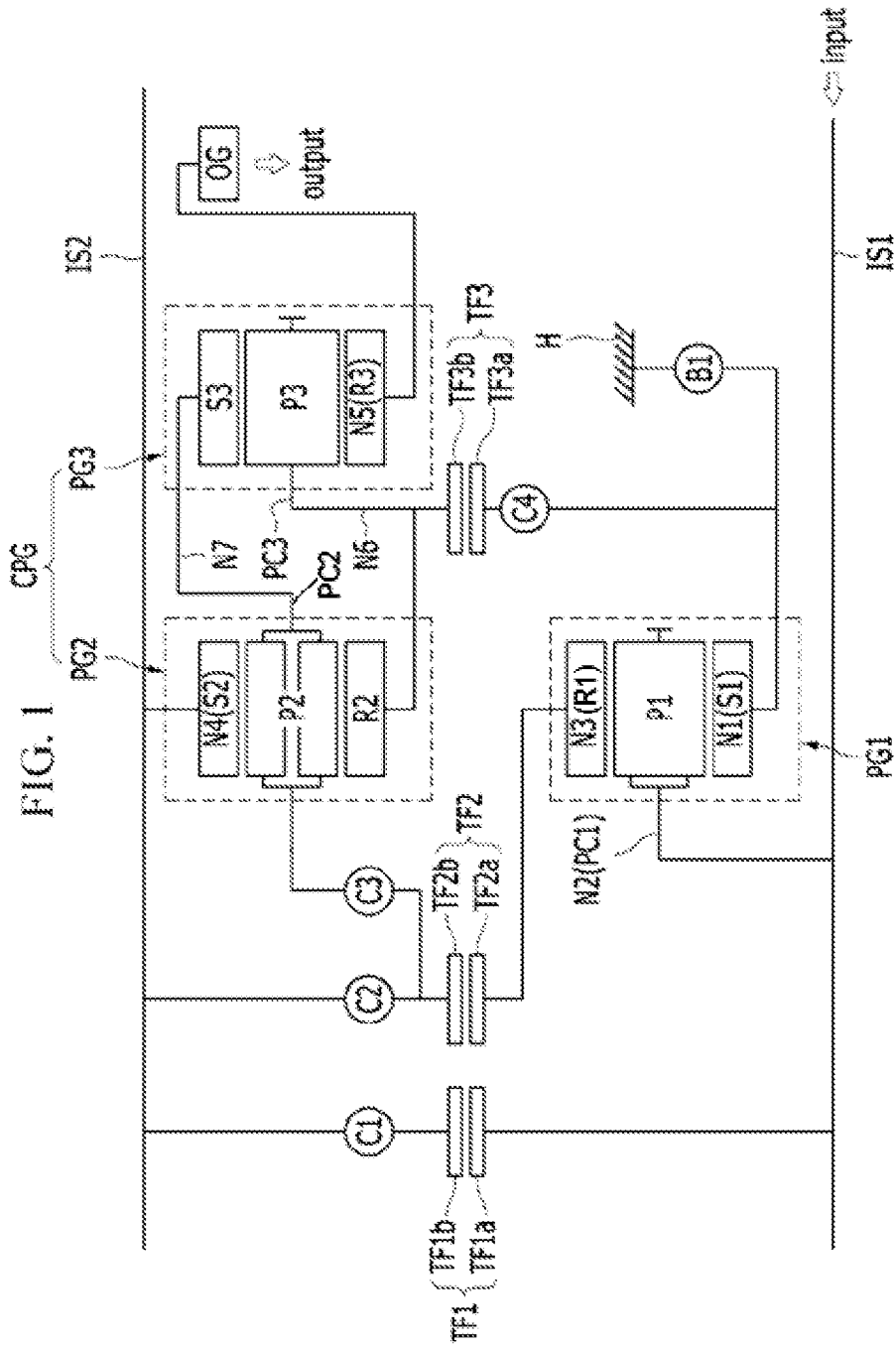
FIG. 1 is a schematic diagram of an exemplary planetary gear train according the present invention.

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Description of components that are not necessary for explaining the illustrated embodiments will be omitted, and the same constituent elements are denoted by the same reference numerals in this specification.

In the detailed description, ordinal numbers are used for distinguishing constituent elements having the same terms, and have no specific meanings.

FIG. 1 is a schematic diagram of a planetary gear train according to various embodiments of the present invention.

Referring to FIG. 1, a planetary gear train according to various embodiments of the present invention includes first, second, and third planetary gear sets PG1, PG2, and PG3, five frictional elements B1, C1, C2, C3, and C4, and three transfer gears TF1, TF2, and TF3.

The first planetary gear set PG1 is disposed on a first shaft IS1, and the second and third planetary gear sets PG2 and PG3 are disposed on a second shaft IS2 disposed apart from and in parallel with the first shaft IS1.

The first shaft IS1 is an input member, supports the first planetary gear set PG1, and transmits torque from an engine to the first planetary gear set PG1.

The second shaft IS2 supports the second and third planetary gear sets PG2 and PG3 and transmits torque selectively transmitted from the first shaft IS1 and the first planetary gear set PG1 to the second planetary gear set PG2.

Therefore, the torque input from the first shaft IS1 is changed into eight forward speeds and one reverse speed by cooperation of the first, second, and third planetary gear sets PG1, PG2, and PG3, and is then output through an output gear OG.

The first planetary gear set PG1 is a single pinion planetary gear set, and has a first sun gear S1, a first ring gear R1, and a first planet carrier PC1 rotatably supporting a first pinion P1 engaged with the first sun gear S1 and the first ring gear R1 as rotation elements thereof.

The second planetary gear set PG2 is a double pinion planetary gear set, and has a second sun gear S2, a second ring gear R2, and a second planet carrier PC2 supporting a second pinion P2 engaged with the second sun gear S2 and the second ring gear R2 are rotation elements thereof.

The third planetary gear set PG3 is a single pinion planetary gear set, and has a third sun gear S3, a third ring gear R3, and a third planet carrier PC3 rotatably supporting a third pinion P3 engaged with the third sun gear S3 and the third ring gear R3 as rotation elements thereof.

The first planetary gear set PG1 is operated as a simple planetary gear train, and the second and third planetary gear sets PG2 and PG3 are operated as a compound planetary gear set CPG.

Therefore, the first planetary gear set PG1 includes three rotation elements N1, N2, and N3.

The first rotation element N1 includes the first sun gear S1, is selectively connected to a transmission housing H so as to be operated as a selective fixed element, and is operated as a selective output element.

The second rotation element N2 includes the first planet carrier PC1, and is directly connected to the first shaft IS1 so as to be operated as an input element.

The third rotation element N3 includes the first ring gear R1 and is operated as a selective output element.

In addition, the second and third planetary gear sets PG2 and PG3 includes four rotation elements N4, N5, N6, and N7 by directly connecting the second ring gear R2 to the third planet carrier PC3 and directly connecting the second planet carrier PC2 to the third sun gear S3.

The fourth rotation element N4 includes the second sun gear S2 and is selectively connected to the first shaft IS1 and the third rotation element N3 through externally-meshed gears.

The fifth rotation element N5 includes the third ring gear R3 and is directly connected to the output gear OG so as to be always operated as a final output element.

The sixth rotation element N6 includes the second ring gear R2 and the third planet carrier PC3, and is selectively connected to the first rotation element N1 through an externally-meshed gear.

The seventh rotation element N7 includes the second planet carrier PC2 and the third sun gear S3, and is selectively connected to the third rotation element N3 through an externally-meshed gear.

In addition, the rotation elements are combined by the first, second, and third transfer gears TF1, TF2, and TF3 and frictional elements consisting of the first brake B1 and the first, second, third, and fourth clutches C1, C2, C3, and C4.

The first, second, and third transfer gears TF1, TF2, and TF3 respectively have first, second, and third transfer drive gears TF1a, TF2a, and TF3a and first, second, and third transfer driven gears TF1b, TF2b, and TF3b externally meshed with each other.

The first transfer gear TF1 includes the first transfer drive gear TF1a connected to the first shaft IS1 and the first transfer driven gear TF1b connected to the fourth rotation element N4, and connects the first shaft IS1 with the fourth rotation element N4.

The second transfer gear TF2 includes the second transfer drive gear TF2a connected to the third rotation element N3 and the second transfer driven gear TF2b selectively connected to the fourth rotation element N4 and the seventh rotation element N7, and selectively connects the third rotation element N3 to the fourth rotation element N4 and the seventh rotation element N7.

The third transfer gear TF3 includes the third transfer drive gear TF3a selectively connected to the first rotation element N1 and the third transfer driven gear TF3b connected to the sixth rotation element N6, and connects the first rotation element N1 to the sixth rotation element N6.

Therefore, the rotation elements connected to each other by the first, second, and third transfer gears TF1, TF2, and TF3 are rotated in opposite direction to each other. Gear ratios of the first, second, and third transfer gears TF1, TF2, and TF3 are set according to speed ratios demanded at shift-speeds.

Arrangements of the frictional elements B1, C1, C2, C3, and C4 will be described in detail.

The first brake B1 is disposed between the first rotation element N1 and the transmission housing H.

The first clutch C1 is disposed between the first transfer gear TF1 and the fourth rotation element N4.

The second clutch C2 is disposed between the second transfer gear TF2 and the fourth rotation element N4.

The third clutch C3 is disposed between the second transfer gear TF2 and the seventh rotation element N7.

The fourth clutch C4 is disposed between the first rotation element N1 and the third transfer gear TF3.

The frictional elements consisting of the first, second, third, and fourth clutches C1, C2, C3, and C4 and the first brake B1 are conventional multi-plate friction elements of wet type that are operated by hydraulic pressure.

It is illustrated in the drawing but is not limited that the first shaft IS1 and the third rotation element N3 are connected to the fourth rotation element N4 through the second shaft IS2. That is, the first shaft IS 1 and the third rotation element N3 may be connected to the fourth rotation element N4 through an additional rotating member disposed at an external circumferential portion of the second shaft IS2 without rotational interference therebetween.

FIG. 2 is an operational chart of friction members at each shift-speed applied to a planetary gear train according to various embodiments of the present invention.

As shown in FIG. 2, three frictional elements are operated at each shift-speed in the planetary gear train according to various embodiments of the present invention.

The first brake B1 and the first and fourth clutches C1 and C4 are operated at a first forward speed 1ST.

The first brake B1 and the second and fourth clutches C2 and C4 are operated at a second forward speed 2ND.

The first, second, and fourth clutches C1, C2, and C4 are operated at a third forward speed 3RD.

The second, third, and fourth clutches C2, C3, and C4 are operated at a fourth forward speed 4TH.

The first, third, and fourth clutches C1, C3, and C4 are operated at a fifth forward speed 5TH.

The first, second, and third clutches C1, C2, and C3 are operated at a sixth forward speed 6TH.

The first brake B1 and the first and third clutches C1 and C3 are operated at a seventh forward speed 7TH.

The first brake B1 and the second and third clutches C2 and C3 are operated at an eighth forward speed 8TH.

The first brake B1 and the third and fourth clutches C3 and C4 are operated at a reverse speed REV.

FIG. 3A to FIG. 3I are lever diagrams of the planetary gear train at each shift-speed according to various embodiments of the present invention, and illustrate shift processes of the planetary gear train according to various embodiments of the present invention by lever analysis method.

Referring to FIG. 3A to FIG. 3I, three vertical lines of the first planetary gear set PG1 are set as the first rotation element N1, the second rotation element N2, and the third rotation element N3, and four vertical lines of the compound planetary gear set CPG are set as the fourth rotation element N4, the fifth rotation element N5, the sixth rotation element N6, and the seventh rotation element N7 from the left to the right.

In addition, a middle horizontal line represents a rotation speed of "0", an upper horizontal line represents a rotation speed of "1.0", and a lower horizontal line represents a rotation speed of "−1.0".

"−" means that rotational elements is rotated in an opposite direction of a rotational direction of the engine. It is because the rotation elements are externally meshed with each other through the first, second, and third transfer gears TF1, TF2, and TF3 without an idling gear.

In addition, the rotation speed of "1.0" represents the same rotational speed as the first shaft IS1 which is an input shaft. Distances between the vertical lines of the first, second, and third planetary gear sets PG1, PG2, and PG3 are set according to each gear ratio (teeth number of a sun gear/teeth number of a ring gear).

Hereinafter, referring to FIG. 2 and FIG. 3A to FIG. 3I, the shift processes of the planetary gear train according to various embodiments of the present invention will be described in detail.

First Forward Speed

Referring to FIG. 2, the first brake B1 and the first and fourth clutches C1 and C4 are operated at the first forward speed 1ST.

Figure 3A:
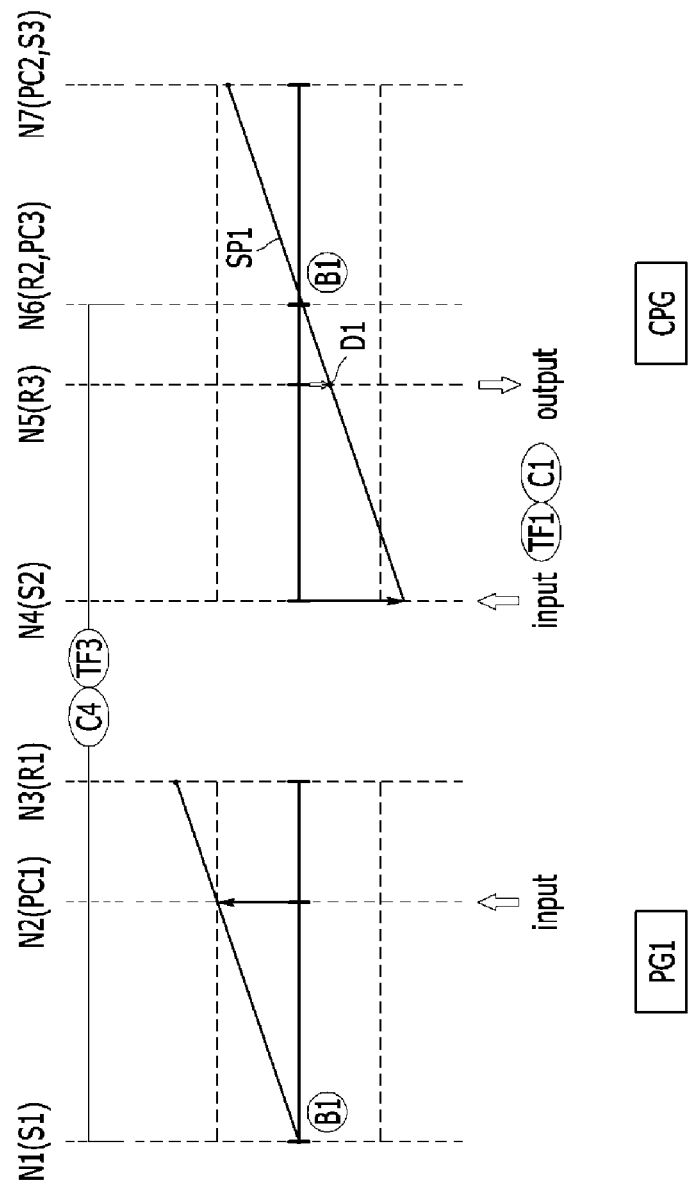
FIG. 3A is a lever diagram of an exemplary planetary gear train at the first forward speed according to the present invention.

As shown in FIG. 3A, the rotation speed of the first shaft IS1 is input to the second rotation element N2 and is changed according to the gear ratio of the first transfer gear TF1 and is then input to the fourth rotation element N4 as an inverse rotation speed by operation of the first clutch C1.

At this state, the first rotation element N1 and the sixth rotation element N6 are operated as fixed elements by operation of the first brake B1 and the fourth clutch C4. Therefore, the rotation elements of the compound planetary gear set CPG form a first shift line SP1 and D1 is output through the fifth rotation element N5 that is the output element.

Second Forward Speed

The first clutch C1 that was operated at the first forward speed 1ST is released and the second clutch C2 is operated at the second forward speed 2ND.

Figure 3B:
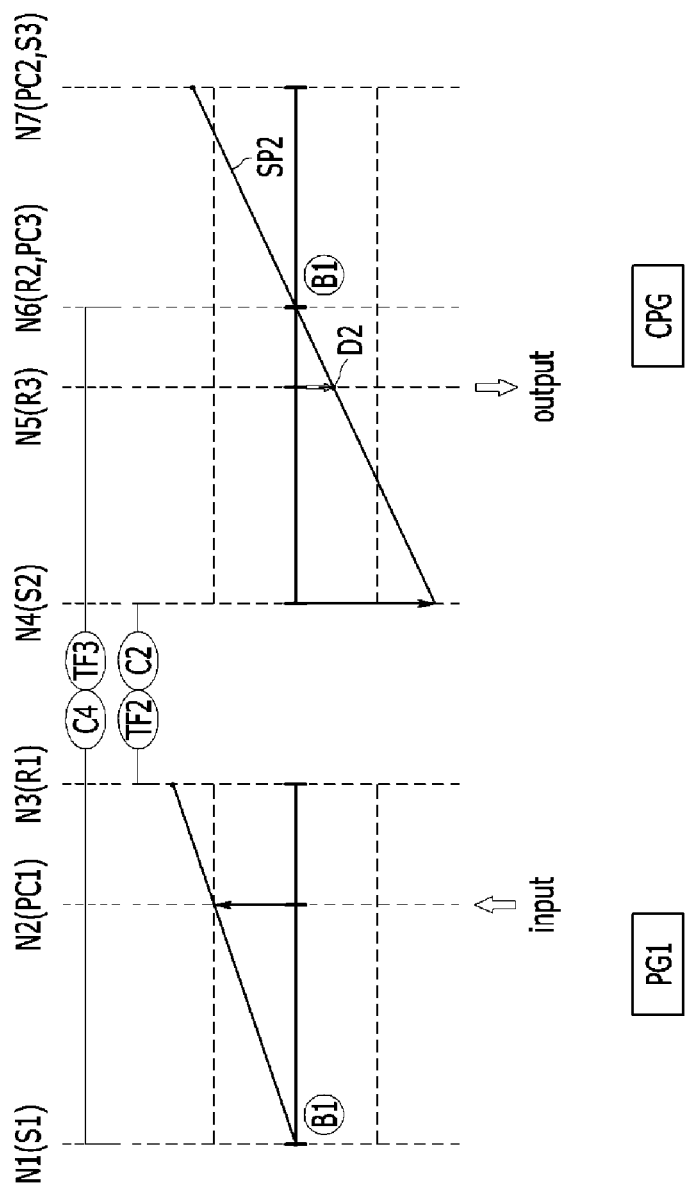
FIG. 3B is a lever diagram of an exemplary planetary gear train at the second forward speed according to the present invention.

As shown in FIG. 3B, the rotation speed of the first shaft IS1 is input to the second rotation element N2, and the rotation speed of the third rotation element N3 is changed according to the gear ratio of the second transfer gear TF2 and is then input to the fourth rotation element N7 as an inverse rotation speed by operation of the second clutch C2.

At this state, the first rotation element N1 and the sixth rotation element N6 are operated as the fixed elements by operation of the first brake B1 and the fourth clutch C4. Therefore, the rotation elements of the compound planetary gear set CPG form a second shift line SP2 and D2 is output through the fifth rotation element N5 that is the output element.

Third Forward Speed

The first brake B1 that was operated at the second forward speed 2ND is released and the first clutch C1 is operated at the third forward speed 3RD.

Figure 3C:
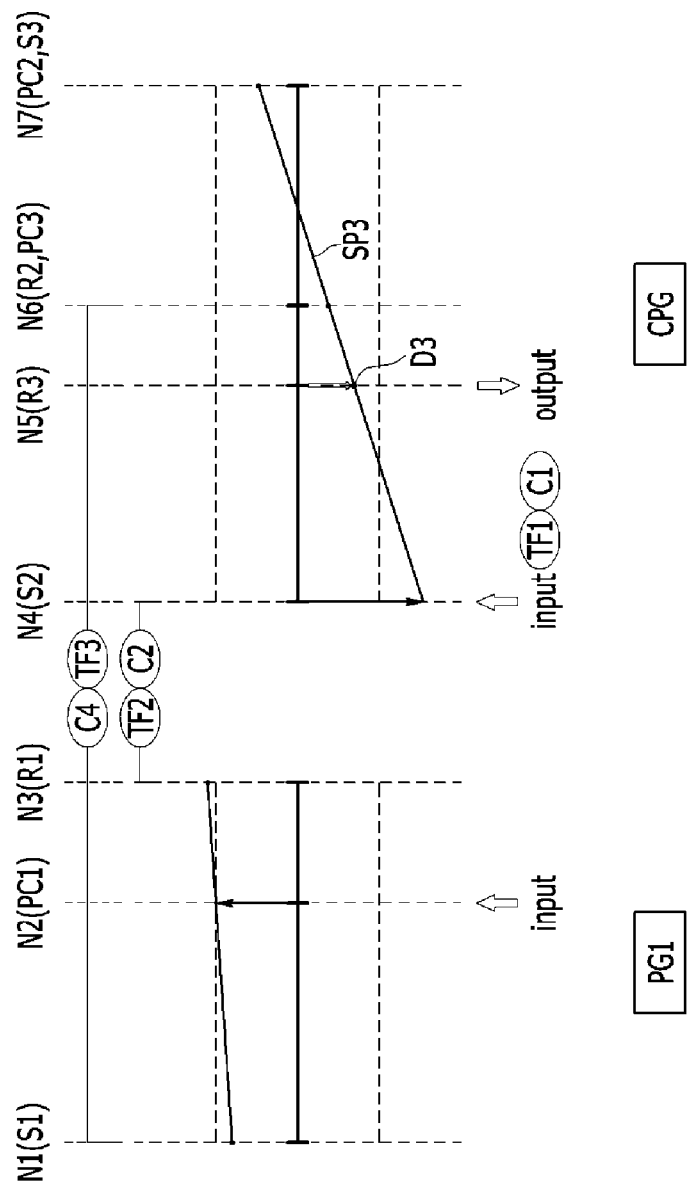
FIG. 3C is a lever diagram of an exemplary planetary gear train at the third forward speed according to the present invention.

As shown in FIG. 3C, the rotation speed of the first shaft IS1 is input to the second rotation element N2 and is changed according to the gear ratio of the first transfer gear TF1 and is then input to the fourth rotation element N4 as the inverse rotation speed by operation of the first clutch C1.

In addition, the first rotation element N1 is connected to the sixth rotation element N6 through the third transfer gear TF3 by operation of the fourth clutch C4, and the third rotation element N3 is connected to the fourth rotation element N4 through the second transfer gear TF2 by operation of the second clutch C2.

Therefore, the rotation elements of the compound planetary gear set CPG form a third shift line SP3 and D3 is output through the fifth rotation element N5 that is the output element.

Fourth Forward Speed

The first clutch C1 that was operated at the third forward speed 3RD is released and the third clutch C3 is operated at the fourth forward speed 4TH.

Figure 3D:
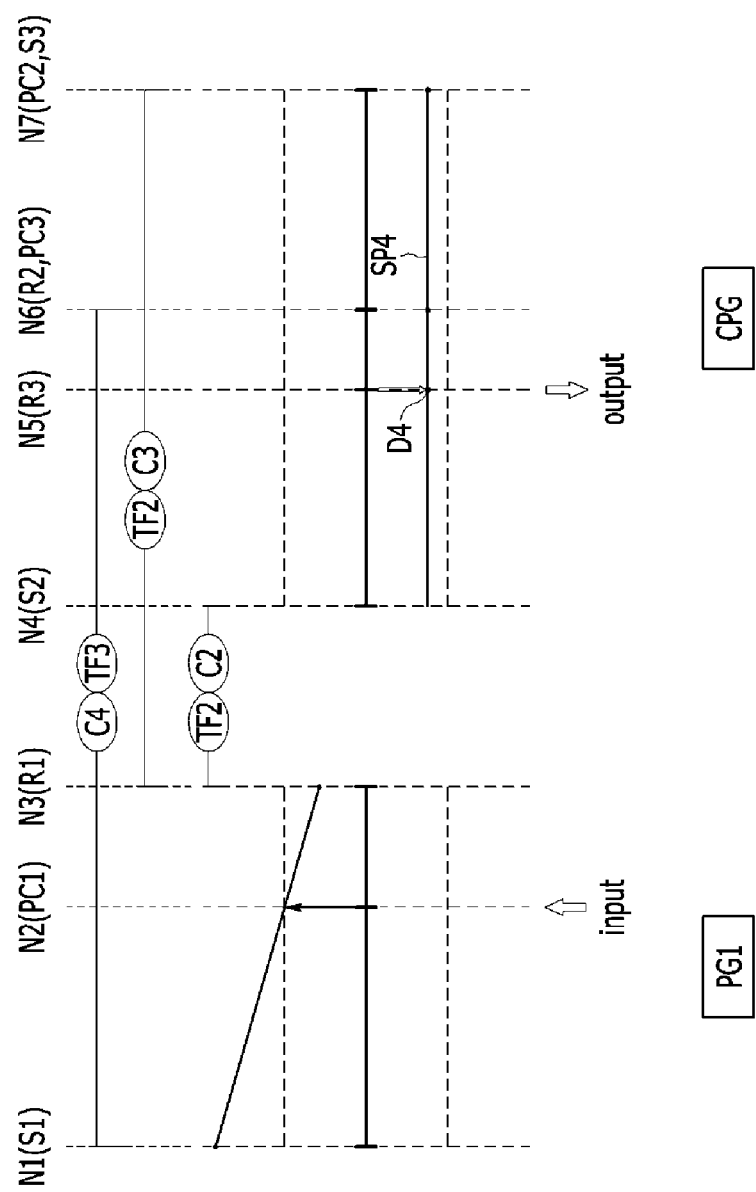
FIG. 3D is a lever diagram of an exemplary planetary gear train at the fourth forward speed according to the present invention.

As shown in FIG. 3D, the rotation speed of the first shaft IS1 is input to the second rotation element N2, and the first rotation element N1 is connected to the sixth rotation element N6 through the third transfer gear TF3 by operation of the fourth clutch C4. In addition, the third rotation element N3 is connected to the fourth rotation element N4 through the second transfer gear TF2 by operation of the second clutch C2 and is connected to the seventh rotation element N7 through the second transfer gear TF2 by operation of the third clutch C3.

Therefore, the rotation elements of the compound planetary gear set CPG form a fourth shift line SP4 and D4 is output through the fifth rotation element N5 that is the output element.

Fifth Forward Speed

The second clutch C2 that was operated at the fourth forward speed 4TH is released and the first clutch C1 is operated at the fifth forward speed 5TH.

Figure 3E:
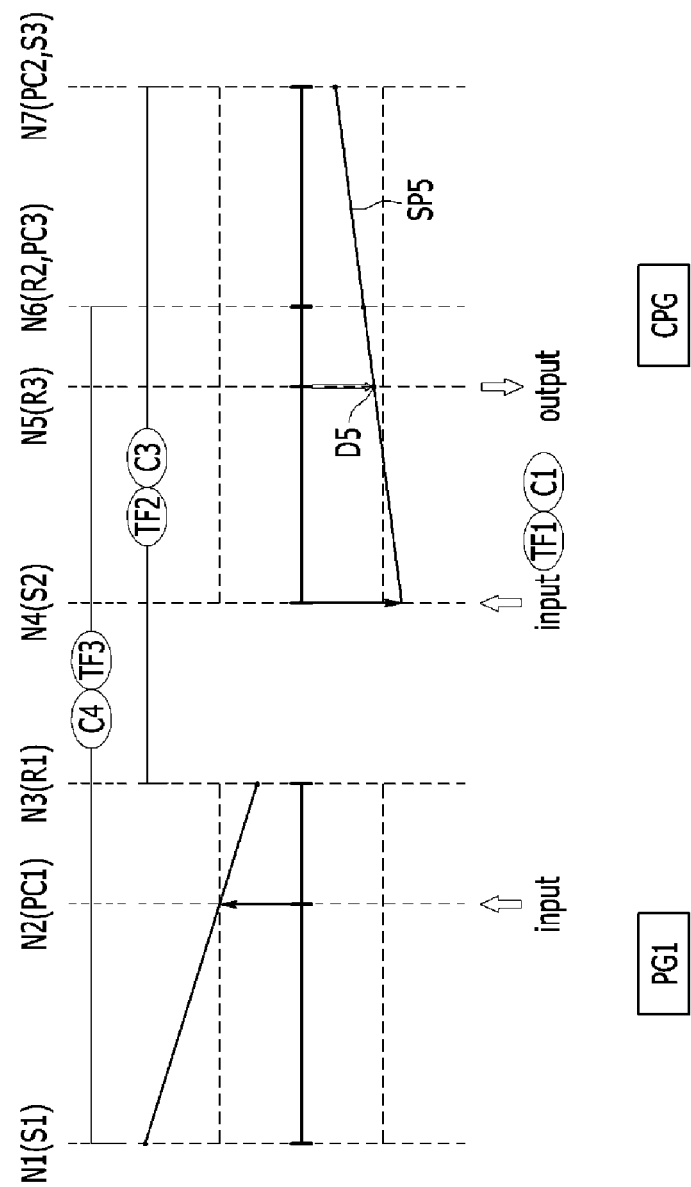
FIG. 3E is a lever diagram of an exemplary planetary gear train at the fifth forward speed according to the present invention.

As shown in FIG. 3E, the rotation speed of the first shaft IS1 is input to the second rotation element N2 and is changed according to the gear ratio of the first transfer gear TF1 and is then input to the fourth rotation element N4 as the inverse rotation speed by operation of the first clutch C1.

In addition, the first rotation element N1 is connected to the sixth rotation element N6 through the third transfer gear TF3 by operation of the fourth clutch C4, and the third rotation element N3 is connected to the seventh rotation element N7 through the second transfer gear TF2 by operation of the third clutch C3.

Therefore, the rotation elements of the compound planetary gear set CPG form a fifth shift line SP5 and D5 is output through the fifth rotation element N5 that is the output element.

Sixth Forward Speed

The fourth clutch C4 that was operated at the fifth forward speed 5TH is released and the second clutch C2 is operated at the sixth forward speed 6TH.

Figure 3F:
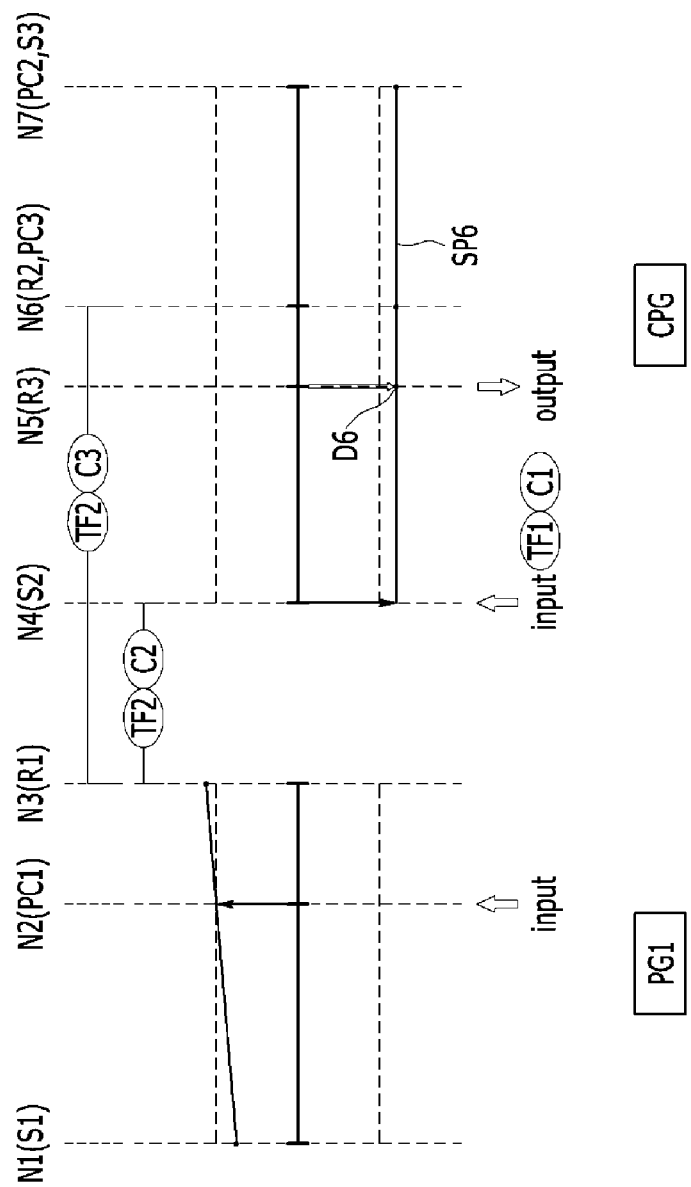
FIG. 3F is a lever diagram of an exemplary planetary gear train at the sixth forward speed according to the present invention.

As shown in FIG. 3F, the rotation speed of the first shaft IS1 is input to the second rotation element N2 and is changed according to the gear ratio of the first transfer gear TF1 and is then input to the fourth rotation element N4 as the inverse rotation speed by operation of the first clutch C1.

At this state, the third rotation element N3 is connected to the fourth rotation element N4 through the second transfer gear TF2 by operation of the second clutch C2 and is connected to the seventh rotation element N7 through the second transfer gear TF2 by operation of the third clutch C3.

Therefore, the rotation elements of the compound planetary gear set CPG form a sixth shift line SP6 and D6 is output through the fifth rotation element N5 that is the output element.

Seventh Forward Speed

The second clutch C2 that was operated at the sixth forward speed 6TH is released and the first brake B1 is operated at the seventh forward speed 7TH.

Figure 3G:
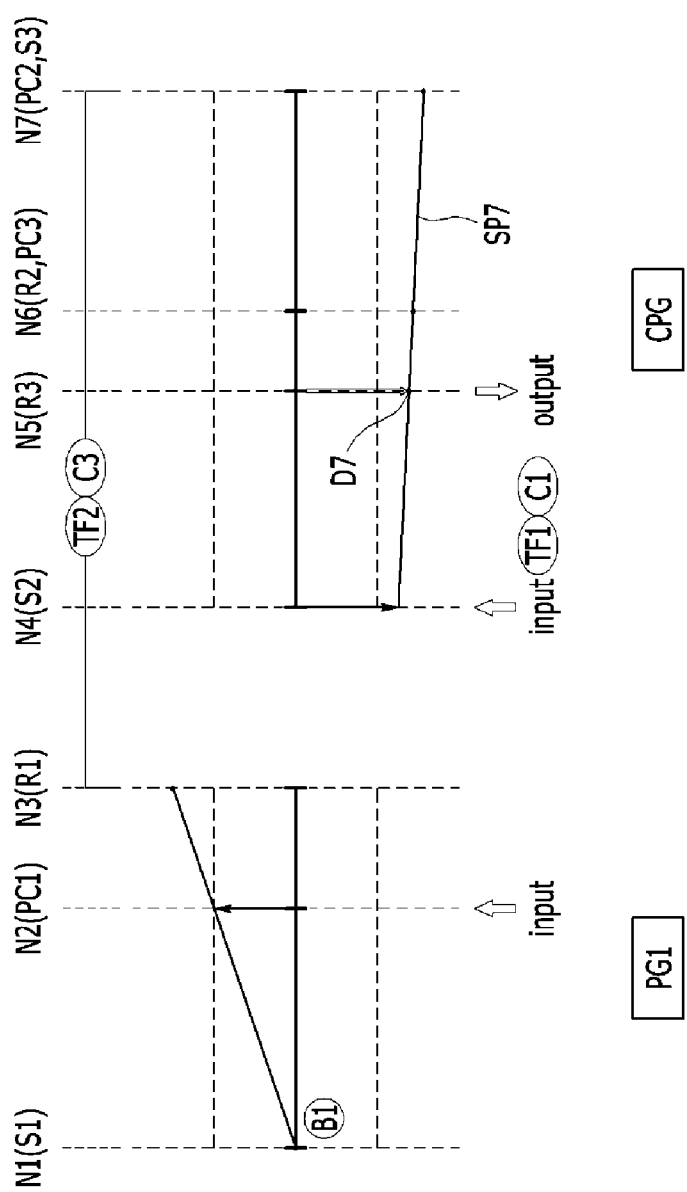
FIG. 3G is a lever diagram of an exemplary planetary gear train at the seventh forward speed according to the present invention.

As shown in FIG. 3G, the rotation speed of the first shaft IS1 is input to the second rotation element N2 and is changed according to the gear ratio of the first transfer gear TF1 and is then input to the fourth rotation element N4 as the inverse rotation speed by operation of the first clutch C1.

In addition, the first rotation element N1 is operated as the fixed element by operation of the first brake B1, and the third rotation element N3 is connected to the seventh rotation element N7 through the second transfer gear TF2 by operation of the third clutch C3.

Therefore, the rotation elements of the compound planetary gear set CPG form a seventh shift line SP7 and D7 is output through the fifth rotation element N5 that is the output element.

Eighth Forward Speed

The first clutch C1 that was operated at the seventh forward speed 7TH is released and the second clutch C2 is operated at the eighth forward speed 8TH.

Figure 3H:
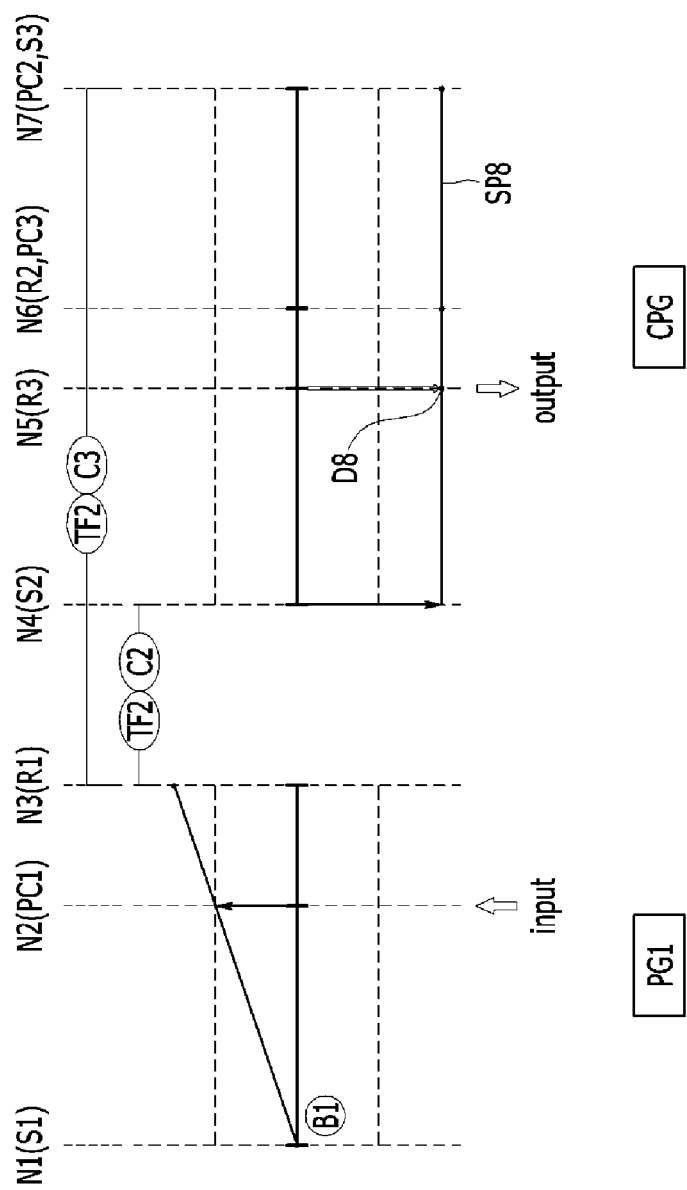
FIG. 3H is a lever diagram of an exemplary planetary gear train at the eighth forward speed according to the present invention.

As shown in FIG. 3H, the rotation speed of the first shaft IS1 is input to the second rotation element N2 and the first rotation element N1 is operated as the fixed element by operation of the first brake B1.

In addition, the third rotation element N3 is connected to the fourth rotation element N4 through the second transfer gear TF2 by operation of the second clutch C2 and is connected to the seventh rotation element N7 through the second transfer gear TF2 by operation of the third clutch C3.

Therefore, the rotation elements of the compound planetary gear set CPG form an eighth shift line SP8 and D8 is output through the fifth rotation element N5 that is the output element.

Reverse Speed

As shown in FIG. 2, the first brake B1 and the third and fourth clutches C3 and C4 are operated at the reverse speed REV.

Figure 3I:
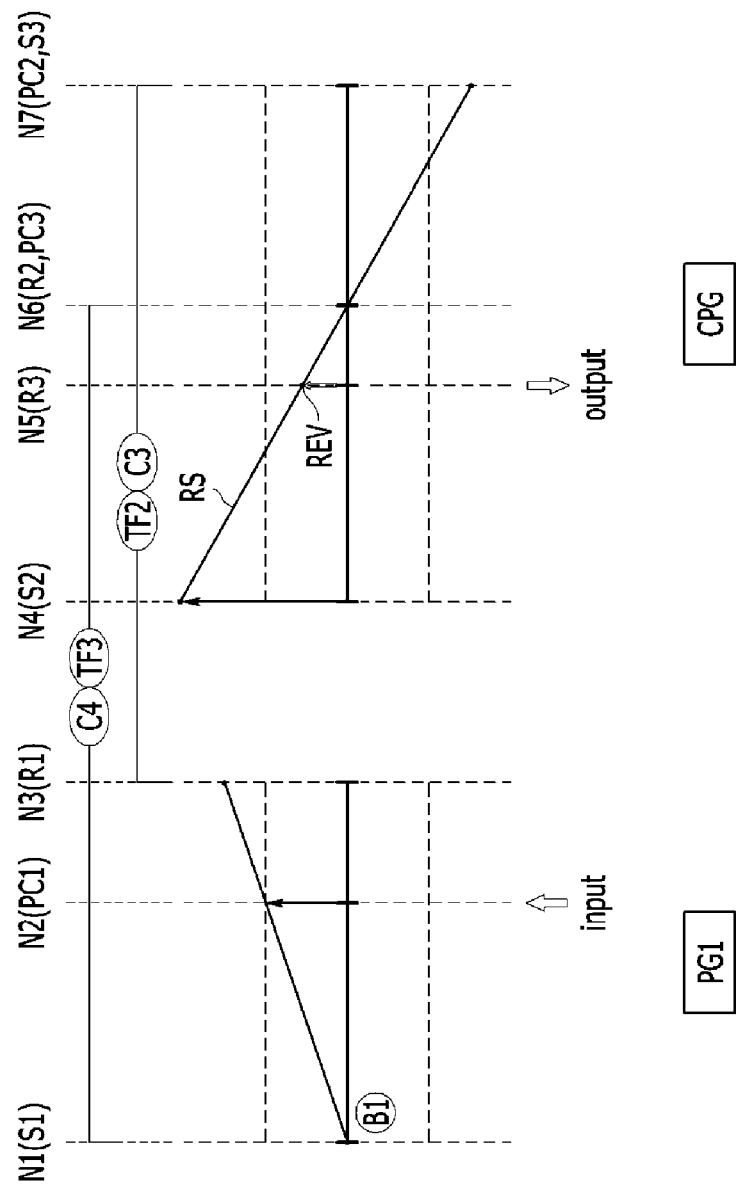
FIG. 3I is a lever diagram of an exemplary planetary gear train at a reverse speed according to the present invention.

As shown in FIG. 3I, the rotation speed of the first shaft IS1 is input to the second rotation element N2, the first rotation element N1 and the sixth rotation element N6 are operated as the fixed elements by operation of the first brake B1 and the fourth clutch C4.

In addition, the third rotation element N3 is connected to the seventh rotation element N7 through the second transfer gear TF2 by operation of the third clutch C3.

Therefore, the rotation elements of the compound planetary gear set CPG form a reverse shift line RS and REV is output through the fifth rotation element N5 that is the output element.

Since three planetary gear sets are separately disposed on the first shaft and the second shaft disposed apart from and in parallel with each other in the planetary gear train according to various embodiments of the present invention, a length thereof may be reduced and mountability may be improved.

In addition, optimum gear ratios may be set due to ease of changing gear ratios by using three external-meshing gears as well as the planetary gear sets. Since gear ratios can be changed according to target performance, starting performance may be improved. Therefore, a start-up clutch instead of a torque converter may be used.

Since three frictional elements are operated at each shift-speed, non-operated frictional element may be minimized and drag torque may be reduced. In addition, fuel consumption may be reduced by increasing power delivery efficiency.

In addition, since torque load of each frictional element can be reduced, compact design is possible.

For convenience in explanation and accurate definition in the appended claims, the terms upper or lower, and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A planetary gear train of an automatic transmission for a vehicle, comprising:
    a first shaft receiving engine torque;
    a second shaft disposed in parallel to the first shaft;
    a first planetary gear set on the first shaft, and including a first rotation element selectively operated as a fixed element, a second rotation element directly connected to the first shaft and operated as an input element, and a third rotation element; and
    a compound planetary gear set formed by combining a second planetary gear set and a third planetary gear set, and including a fourth rotation element selectively connected to the first shaft through a first transfer gear and selectively connected to the third rotation element through a second transfer gear, a fifth rotation element connected to an output gear so as to be continuously operated as an output element, a sixth rotation element selectively connected to the first rotation element through a third transfer gear, and a seventh rotation element selectively connected to the third rotation element through the second transfer gear.

2. The planetary gear train of claim 1, wherein the first planetary gear set is a single pinion planetary gear set including a first sun gear, a first planet carrier, and a first ring gear as rotation elements thereof;
    the second planetary gear set is a double pinion planetary gear set including a second sun gear, a second planet carrier, and a second ring gear as rotation elements thereof; and
    the third planetary gear set is a single pinion planetary gear set including a third sun gear, a third planet carrier, and a third ring gear as rotation elements thereof.

3. The planetary gear train of claim 2, wherein:
    the first rotation element has the first sun gear;
    the second rotation element has the first planet carrier;
    the third rotation element has the first ring gear;
    the fourth rotation element has the second sun gear;
    the fifth rotation element has the third ring gear;
    the sixth rotation element has the second ring gear and the third planet carrier; and the seventh rotation element has the second planet carrier and the third sun gear.

4. The planetary gear train of claim 1, further comprising frictional elements including:
a first clutch disposed between the fourth rotation element and the first transfer gear;
a second clutch disposed between the second transfer gear and the fourth rotation element;
a third clutch disposed between the second transfer gear and the seventh rotation element;
a fourth clutch disposed between the first rotation element and the third transfer gear; and
a first brake disposed between the first rotation element and a transmission housing.

5. The planetary gear train of claim 4, wherein the first brake and the first and fourth clutches are operated at a first forward speed;
the first brake and the second and fourth clutches are operated at a second forward speed;
the first, second, and fourth clutches are operated at a third forward speed;
the second, third, and fourth clutches are operated at a fourth forward speed;
the first, third, and fourth clutches are operated at a fifth forward speed;
the first, second, and third clutches are operated at a sixth forward speed;
the first brake and the first and third clutches are operated at a seventh forward speed;
the first brake and the second and third clutches are operated at an eighth forward speed; and
the first brake and the third and fourth clutches are operated at a reverse speed.

6. A planetary gear train of an automatic transmission for a vehicle, comprising:
a first shaft receiving engine torque;
a second shaft disposed in parallel to the first shaft;
a first planetary gear set on the first shaft, and including a first rotation element selectively operated as a fixed element, a second rotation element directly connected to the first shaft so as to be operated as an input element, and a third rotation element;
a compound planetary gear set formed by combining a second planetary gear set and a third planetary gear set, and including a fourth rotation element selectively connected to the first shaft and selectively connected to the third rotation element, a fifth rotation element connected to an output gear so as to be continuously operated as an output element, a sixth rotation element selectively connected to the first rotation element, and a seventh rotation element selectively connected to the third rotation element;
a first transfer gear disposed between the first shaft and the fourth rotation element;
a second transfer gear disposed between the third rotation element and the fourth rotation element;
a third transfer gear disposed between the first rotation element and the sixth rotation element;
a first clutch disposed between the fourth rotation element and the first transfer gear;
a second clutch disposed between the second transfer gear and the fourth rotation element;
a third clutch disposed between the second transfer gear and the seventh rotation element;
a fourth clutch disposed between the first rotation element and the third transfer gear; and
a first brake disposed between the first rotation element and a transmission housing.

7. The planetary gear train of claim 6, wherein the first planetary gear set is a single pinion planetary gear set and includes a first sun gear being the first rotation element, a first planet carrier being the second rotation element, and a first ring gear being the third rotation element; and
the compound planetary gear set is formed by combining the second planetary gear set being a double pinion planetary gear set and the third planetary gear set being a single pinion planetary gear set, and includes a second sun gear being the fourth rotation element, a third ring gear being the fifth rotation element, a second ring gear and a third planet carrier being the sixth rotation element, and a second planet carrier and a third sun gear being the seventh rotation element.

8. The planetary gear train of claim 6, wherein:
the first brake and the first and fourth clutches are operated at a first forward speed;
the first brake and the second and fourth clutches are operated at a second forward speed;
the first, second, and fourth clutches are operated at a third forward speed;
the second, third, and fourth clutches are operated at a fourth forward speed;
the first, third, and fourth clutches are operated at a fifth forward speed;
the first, second, and third clutches are operated at a sixth forward speed;
the first brake and the first and third clutches are operated at a seventh forward speed;
the first brake and the second and third clutches are operated at an eighth forward speed; and
the first brake and the third and fourth clutches are operated at a reverse speed.

* * * * *